United States Patent
Kusume et al.

(10) Patent No.: US 6,761,968 B2
(45) Date of Patent: Jul. 13, 2004

(54) BIAXIALLY ORIENTED POLYESTER FILM

(75) Inventors: Hiroshi Kusume, Sagamihara (JP); Koji Furuya, Sagamihara (JP)

(73) Assignee: Teijin Limited, Osaka (JP)

(*) Notice: Subject to any disclaimer, the term of this patent is extended or adjusted under 35 U.S.C. 154(b) by 2 days.

(21) Appl. No.: 10/433,328

(22) PCT Filed: Nov. 29, 2001

(86) PCT No.: PCT/JP01/10436
§ 371 (c)(1),
(2), (4) Date: Jun. 2, 2003

(87) PCT Pub. No.: WO02/43944
PCT Pub. Date: Jun. 6, 2002

(65) Prior Publication Data
US 2004/0028925 A1 Feb. 12, 2004

(30) Foreign Application Priority Data

| Dec. 1, 2000 | (JP) | 2000-366857 |
| Dec. 18, 2000 | (JP) | 2000-383306 |
| Mar. 26, 2001 | (JP) | 2001-087150 |
| Mar. 26, 2001 | (JP) | 2001-087151 |

(51) Int. Cl.$^7$ .................. B32B 27/08; B32B 27/20; B32B 27/30; B32B 27/36; B32B 27/40

(52) U.S. Cl. .................. 428/328; 428/323; 428/330; 428/331; 428/423.7; 428/480; 428/483; 428/910

(58) Field of Search .................. 428/323, 328, 428/330, 331, 423.7, 480, 483, 694 SL, 694 ST, 695, 910

(56) References Cited

U.S. PATENT DOCUMENTS 4,497,865 A * 2/1985 Minami et al. ............. 428/336

FOREIGN PATENT DOCUMENTS

| EP | 951991 A1 | 10/1999 |
| EP | 953458 A1 | 11/1999 |
| EP | 1022152 A1 | 7/2000 |
| EP | 1029704 A1 | 8/2000 |
| JP | 52-52876 A | 4/1976 |
| JP | 62-95289 A | 5/1987 |
| JP | 62-193889 A | 8/1987 |
| JP | 62-233227 A | 10/1987 |
| JP | 62-299389 A | 12/1987 |
| JP | 1-208188 A | 8/1989 |
| JP | 1-266145 A | 10/1989 |
| JP | 2-47095 A | 2/1990 |
| JP | 2-206591 A | 8/1990 |
| JP | 4-65223 A | 3/1992 |
| JP | 07-223287 * | 8/1995 |
| JP | 08-224777 * | 9/1996 |
| JP | 9-1947 A | 1/1997 |
| JP | 9-52457 A | 2/1997 |
| JP | 10-244769 A | 9/1998 |
| JP | 11-129327 A | 5/1999 |
| JP | 11-170358 A | 6/1999 |
| JP | 11-170359 A | 6/1999 |
| JP | 11-312132 A | 11/1999 |
| JP | 11-321135 A | 11/1999 |
| JP | 2000-85082 A | 3/2000 |
| JP | 2000-071405 * | 3/2000 |
| JP | 2000-103874 A | 4/2000 |
| JP | 2000-344908 A | 12/2000 |

* cited by examiner

Primary Examiner—Vivian Chen
(74) Attorney, Agent, or Firm—Sughrue Mion, PLLC

(57) ABSTRACT

A biaxially oriented polyester film which has excellent productivity while ensuring a transferred image having excellent shape reproducibility and gradation and is particularly suitable for use as a base film for a heat-sensitive transfer ribbon. This film is formed by simultaneous biaxial orientation and contains 0.1 to 2 wt % of inert inorganic particles having an average particle diameter of 0.5 to 5 μm. This biaxially oriented polyester film has a value of 0.028 or less obtained by dividing the heat shrinkage factor (HS) (%) in a longitudinal direction at 200° C. by the F-5 value (N/mm$^2$) (F5) in the longitudinal direction measured at normal temperature (about 23° C.) of the film.

20 Claims, 1 Drawing Sheet

BIAXIALLY ORIENTED POLYESTER FILM

FIELD OF THE INVENTION

The present invention relates to a biaxially oriented polyester film formed by simultaneous biaxial orientation. More specifically, it relates to a biaxially oriented polyester film formed by simultaneous biaxial orientation, which has excellent printing performance without ink transfer nonuniformity even when printing is carried out at a high speed and excellent productivity without a break and delamination during the process or use, and is suitable for use as a base film for a heat-sensitive transfer ribbon.

DESCRIPTION OF THE RELATED ART

A film having a specific surface roughness (JP-A 62-299389) (the term "JP-A" as used herein means an "unexamined published Japanese patent application") is known as a base film for use with a thermal transfer printer. Demand for a subliming transfer recording system out of transfer recording systems is growing because it can output a high-quality full-color image easily. As for this subliming heat-sensitive transfer, a thermally subliming dye is contained in a binder so that only the dye is sublimated by heat and absorbed into the image receiving layer of a transferred sheet to form an image having gradation. In this subliming transfer recording system, a high printing speed is now desired. To increase the printing speed, the method of transmitting heat from a thermal head at the time of printing efficiently is effective and, accordingly, a reduction in the thickness of a base film is desired. However, when the thickness of a conventional stretched film is simply reduced to meet this demand, the following problem arises. For example, when a dye ink is applied to a thin film or in the slitting step, work efficiency lowers due to a reduction in the thickness of a film.

This work efficiency is related to the slipperiness of a film. To improve this, fine irregularities are generally formed on the surface of the film. More specifically, there are known a method (external particle addition method) in which inert particles are added during or after the polymerization of a thermoplastic polymer which is a raw material of a film, a method (internal particle precipitation method) in which part or all of a catalyst used for the polymerization of a thermoplastic polymer is precipitated in the polymer in the reaction step, and the like.

However, in the method of producing an extremely thin film, when a thin film is formed from a polyester containing inert particles in the same amount as a normal film, the number of inert particles per unit area decreases, the interval between adjacent inert particles on the surface of the film expands, and the surface of the film becomes too flat, thereby reducing slipperiness. Therefore, in order to compensate for deterioration in slipperiness caused by a reduction in the thickness of the film, the amount of inert particles to be contained or the diameter of the particles must be increased as the thickness of the film decreases.

In this case, a large number of voids are often produced at the interface, that is, around the inert particles due to low affinity between the inert particles and the thermoplastic polymer at the time of melt extrusion or stretching at a high draft ratio. As the result of the production of voids, fine particles easily fall off from the obtained film, chippings produced by contact between the film and a roller contaminate the process, the film easily breaks, productivity lowers, and production conditions lack stability. Particularly when a coarse particle is existent on the slit section, the film breaks from that particle.

To solve the above problems, JP-A 2000-103874 proposes that 0.1 to 2 wt % of calcium carbonate having an average particle diameter of 0.5 to 4 $\mu$m and 0.05 to 1 wt % of aluminum silicate having an average particle diameter of 0.1 to 2.0 $\mu$m are contained in a biaxially oriented polyester film obtained by sequential biaxial orientation. According to the publication, since affinity between the inert particles and the thermoplastic polymer is improved even at the time of melt extrusion or stretching at a high draft ratio, voids produced at the interface therebetween, that is, around the inert particles can be suppressed.

According to researches conducted by the inventors of the present invention, the problems that the process is contaminated and that the film is easily broken by chippings produced by contact between the film and the roller have been overcome due to above biaxially oriented polyester film which voids are supressed to be produced. However, a new problem has been found that when the film is used as a subliming heat-sensitive transfer material, a ribbon is deformed by the heat of a thermal head, thereby reducing the reproducibility of an image.

Heretofore, means of improving dimensional stability has been employed to suppress the deformation of the ribbon. More specifically, the molecular chain is more highly aligned by stretching the film at a higher draft ratio or more highly crystallized by thermal-setting the film at a higher temperature or for a longer time. However, when the molecular chain is highly oriented or highly crystallized by sequential biaxial orientation to solve this problem, delamination often occurs, thereby causing a break and a product defect with the result of reduced productivity.

It is therefore an object of the present invention to provide a biaxially oriented polyester film which solves the above problems, has excellent productivity while ensuring a transferred image having excellent shape reproducibility and gradation and is particularly suitable for use as a base film for a heat-sensitive transfer ribbon.

Other objects and advantages of the present invention will become apparent from the following description.

SUMMARY OF THE INVENTION

According to the present invention, the above objects and advantages of the present invention are attained by a biaxially oriented polyester film which (A) contains 0.1 to 2 wt % of first inert inorganic particles having an average particle diameter of 0.5 to 5 $\mu$m, (B) satisfies the relationship $HS/F5 \leq 0.028$ in which HS is a heat shrinkage factor (%) in the longitudinal direction of the film when it is heated at 200° C. for 10 minutes and F5 is an F-5 value (N/mm$^2$) in the longitudinal direction of the film at 23° C., and (C) is formed by simultaneous biaxial orientation.

DETAILED DESCRIPTION OF THE PREFERRED EMBODIMENT

Polyester

Figure 1:
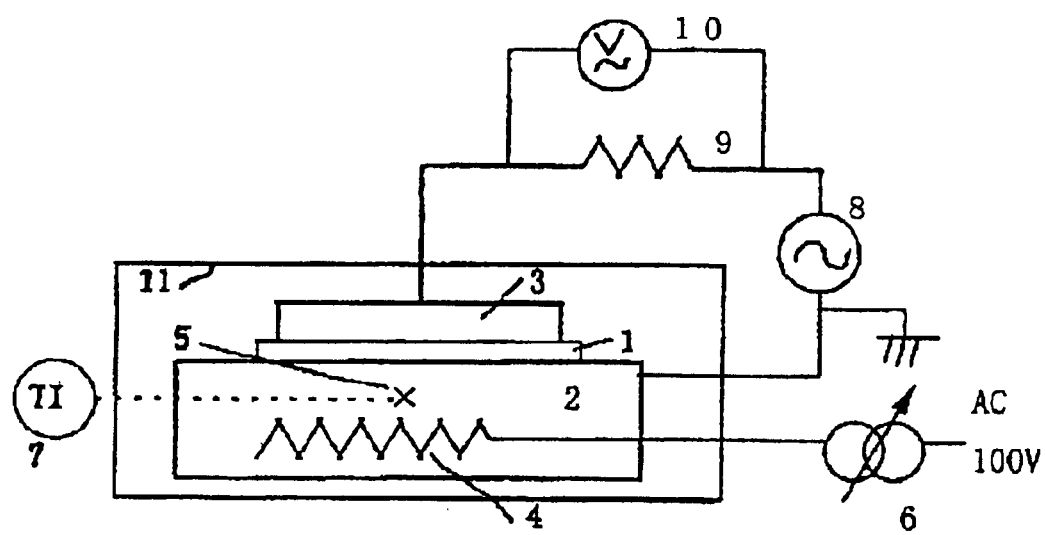
FIG. 1 is a diagram for explaining an apparatus for measuring the volume resistivity of a film.

The polyester in the present invention is preferably a polyester which comprises ethylene-2,6-naphthalene dicarboxylate or ethylene terephthalate as the main component. It is more preferably a polyester which comprises ethylene-26-naphthalene dicarboxylate as the main component because a film having high mechanical strength and relatively small thickness and capable of transmitting the heat of a thermal head to a subliming dye easily can be produced and tear resistance which is a weak point of the film is improved by simultaneous biaxial orientation.

The above polyester comprising ethylene-2,6-naphthalene dicarboxylate as the main component (may be referred to as "polyethylene-2,6-naphthalene dicarboxylate" or "PEN" hereinafter) is preferably a polymer which comprises ethylene-2,6-naphthalene dicarboxylate in an amount of 80 mol % or more based on the total of all the recurring units. The amount of ethylene-2,6-naphthalene dicarboxylate is more preferably 90 mol % or more, particularly preferably 95 mol % or more. When PEN is a copolymer, the comonomer is a compound having two ester forming functional groups, for example, dicarboxylic acid such as oxalic acid, adipic acid, phthalic acid, sebacic acid, dodecanedicarboxylic acid, succinic acid, 5-sodium sulfoisophthalic acid, terephthalic acid, isophthalic acid, 2-potassium sulfoterephthalic acid, 2,7-naphthalenedicarboxylic acid, 1,4-cyclohexanedicarboxylic acid, 4,4'-diphenyldicarboxylic acid, phenylindanedicarboxylic acid or diphenyl ether dicarboxylic acid; oxycarboxylic acid such as p-oxyethoxybenzoic acid; or diol such as propylene glycol, 1,2-propanediol, 1,3-butanediol, 1,4-butanediol, 1,5-petnanediol, 1,6-hexanediol, 1,2-cyclohexane dimethanol, 1,3-cyclohexane dimethanol, 1,4-cyclohexane dimethanol, p-xylylene glycol, ethylene oxide adduct of bisphenol A, ethylene oxide adduct of bisphenol sulfone, triethylene glycol, polyethylene oxide glycol, polytetramethylene oxide glycol or neopentyl glycol. Out of these, a copolyester comprising 1 to 5 mol % of isophthalic acid is preferred because it has relatively high tear strength, and a homopolyester essentially consisting of ethylene-2,6-naphthalene dicarboxylate is also preferred because it has relatively high strength and dimensional stability at a high temperature. The above PEN may be obtained by capping part or all of the terminal hydroxyl groups and/or carboxyl groups in the molecular chain with a monofunctional compound such as benzoic acid or methoxypolyalkylene glycol, or modified by a trace amount of an ester forming compound having a functionality of 3 or more such as glycerin or pentaerythritol to obtain a substantially linear polymer.

The above PEN is known per se and can be produced by a conventionally known method. It is preferably produced by an ester exchange method, that is, carrying out an ester exchange reaction between an ester forming derivative (particularly dimethyl ester) of 2,6-naphthalene dicarboxylate and PEN and then the polycondensation reaction of the obtained reactive product at a high temperature and a high degree of vacuum until a desired degree of polymerization is obtained. An ester exchange reaction catalyst for the above ester exchange reaction is preferably a manganese compound. The manganese compound is, for example, an oxide, chloride, carbonate or carboxylate of manganese. Out of these, manganese acetate is particularly preferred. When the ester exchange reaction is substantially terminated, a phosphorus compound is preferably added to deactivate the ester exchange catalyst. Preferred examples of the phosphorus compound include trimethyl phosphate, triethyl phosphate, tri-n-butyl phosphate and phosphoric acid. Out of these, trimethyl phosphate is particularly preferred. Further, an antimony compound is preferably used as a polycondensation catalyst. This antimony compound is particularly preferably antimony trioxide.

The intrinsic viscosity (orthochlorophenol, 35° C.) of the above polyester is preferably 0.50 to 1.10, more preferably 0.52 to 0.95, particularly preferably 0.54 to 0.75. When the intrinsic viscosity is lower than 0.50, the tear strength of the formed film may become unsatisfactory. When the intrinsic viscosity is higher than 1.10, productivity may be impaired in the raw material production process and film formation process.

Inert Inorganic Particles

The biaxially oriented polyester film of the present invention contains inert inorganic particles (first inert inorganic particles) in an amount of 0.1 to 2 wt %. The first inert inorganic particles have an average particle diameter of 0.5 to 5 $\mu$m. Various inorganic compound particles may be used as the first inert inorganic particles. Preferred examples of the inorganic compound particles include porous silica particles, silica particles (non-porous silica particles) and calcium carbonate.

The porous silica particles preferably have an average particle diameter of 1 to 3 $\mu$m. The biaxially oriented polyester film preferably contains 0.05 to 2 wt % of second silica particles having an average particle diameter smaller than the first inert inorganic particles and as large as 0.01 to 0.8 $\mu$m and an aspect ratio (particle diameter ratio=long diameter/short diameter) of 1.0 to 1.2 together with the porous silica particles. The porous silica particles show high affinity for polyethylene-2,6-naphthalene dicarboxylate or polyethylene terephthalate.

When the average particle diameter of the porous silica particles is smaller than 0.5 $\mu$m and the film is wound round a master roll or a product roll, the film readily wrinkles due to low air squeezability (contained air is hardly squeezed out), slipperiness of the film is unsatisfactory, and work efficiency in the processing step lowers disadvantageously. When the average particle diameter is larger than 5 $\mu$m, the surface of the film becomes too rough, and a coating speck is produced at the time of applying ink, resulting in printing nonuniformity when an ink ribbon is produced by using the film. The average particle diameter of the porous silica particles may be larger than the thickness of the film. This is because the porous silica particles have high affinity for polyesters, especially polyethylene-2,6-naphthalene dicarboxylate and polyethylene terephthalate.

As means of producing the above porous silica particles, there is known a method in which silica primary particles are dispersed in water to form colloidal particles and its sol is dried to form a specific porous gel (JP-A 52-52876).

Conventionally known particle preparation methods may be used to obtain particles having a predetermined average particle diameter. For example, particles having a predetermined average particle diameter and a particle size distribution can be preferably prepared by grinding, classification and the like.

As for the particle size distribution of the porous silica particles, particles rarely containing coarse particles having a diameter of about 10 $\mu$m or more and having a sharp distribution on a smaller particle diameter side are preferred. The term "average particle diameter" as used herein means the sphere equivalent diameter of particles which account for 50 wt % of the total of all the measured particles. The "sphere equivalent diameters" means the diameter of an imaginary sphere (ideal sphere) having the same capacity as a particle and can be measured from an electron photomicrograph of the particle or by a general sedimentation method.

In the present invention, the content of the porous silica particles must be 0.1 to 2 wt %, preferably 0.1 to 1 wt % based on the polyester. When the content is lower than 0.1 wt %, air squeezability at the time of winding becomes unsatisfactory and when the content is higher than 2 wt %, the surface of the film becomes too rough, and a coating speck is produced at the time of applying ink disadvantageously.

In the present invention, it is more preferred that second silica particles are dispersed and contained in the polyester in an extremely thin film in particular, together with the above porous silica. As described above, the second silica particles have an average particle diameter smaller than the first inert inorganic particles and as large as 0.01 to 0.8 μm and an aspect ratio of 1.0 to 1.2. The shape of each of the second silica particles is almost globular. When this average particle diameter is larger than the thickness of the film, the film around projections formed by the second silica particles often cracks and breaks in the stretching or heat setting step. Therefore, the average particle diameter of the second silica particles is preferably 90% or less, more preferably 80% or less of the thickness of the film.

Further, the average particle diameter of the second silica particles is preferably 0.1 to 1 μm, more preferably 0.2 to 0.8 μm as far as it is smaller than the thickness of the film. When the average particle diameter is smaller than 0.1 μm, the slipperiness of the film becomes unsatisfactory, thereby reducing work efficiency in the processing step. When the average particle diameter is larger than 1 μm, the surface of the film becomes too rough, and a coating speck is produced at the time of applying ink disadvantageously. The aspect ratio of the second silica particles is preferably 1.0 to 1.2, more preferably 1.0 to 1.15, particularly preferably 1.0 to 1.1. A particle diameter ratio of 1.0 means that the particle is substantially spherical.

The above second silica particles are not limited by their production process and others if they satisfy the above conditions. For example, the second silica particles can be produced by preparing hydrous silica [Si(OH)$_4$] monodisperse spheres through the hydrolysis of ethyl orthosilicate [Si(OC$_2$H$_5$)]$_4$ and dehydrating this hydrous silica monodisperse spheres to grow the following silica bond three-dimensionally (Nippon Kagakukaishi (bulletin of the Japanese Society of Chemistry) '81, No. 9, p. 1503). These reactions are shown by the following formulas.

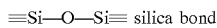

≡Si—O—Si≡ silica bond

Si(OC$_2$H$_5$)$_4$+4H$_2$O→Si(OH)$_4$+4C$_2$H$_5$OH

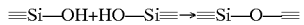

≡Si—OH+HO—Si≡→≡Si—O—≡

The content of the second silica particles in the present invention is preferably 0.02 to 2 wt %, more preferably 0.05 to 0.8 wt %, particularly preferably 0.1 to 0.6 wt % based on the polyester. When this content is lower than 0.02 wt %, the effect of improving slipperiness becomes unsatisfactory and when the content is higher than 1 wt %, film forming properties and mechanical strength lower disadvantageously. When the content of the first porous silica particles or the second silica particles is too low, a multiplication effect obtained by using two different kinds of particles is not acquired and air squeezability at the time of winding or slipperiness at the time of processing becomes unsatisfactory.

Addition of the porous silica particles and the second silica particles to the polyester is preferably carried out before the completion of the polymerization of the polyester. They are preferably added to a reaction system before the end of the ester exchange reaction (preferably as a slurry in glycol). A polyester containing the porous silica particles and a polyester containing the second silica particles may be produced separately and blended together to prepare a predetermined composition.

When the first inert inorganic particles are first silica particles (non-porous silica particles), the first silica particles have an aspect ratio of 1.0 to 1.2. The second silica particles having an average particle diameter smaller than the first silica particles and as large as 0.01 to 0.8 μm and an aspect ratio of 1.0 to 1.2 are preferably contained in an amount of 0.05 to 2 wt % together with the first silica particles.

As described above, by containing two different kinds of silica particles having different average particle diameters, fine projections derived from these inert particles are existent on the surface of the film, thereby making it possible to obtain excellent work efficiency and a suitable space factor.

The first and second silica particles dispersed in the polyester have an aspect ratio of 1.0 to 1.2, respectively. Since these two different kinds of silica particles have an aspect ratio of 1.0 to 1.2, respectively, the fine particles are almost spherical and greatly differ from silica fine particles which have been conventionally known as a lubricant composed of super fine block particles having a diameter of about 10 nm or agglomerates thereof (agglomerated particles) having a diameter of about 0.5 μm.

The aspect ratio can be obtained from the following equation. The method of obtaining the aspect ratio will be described hereinafter.

Aspect ratio=average long diameter of silica particles/average short diameter of silica particles The first silica particles have an average particle diameter of preferably 0.5 to 2 μm, more preferably 0.08 to 1.5 μm. The second silica particles have an average particle diameter of 0.01 to 0.8 μm, preferably 0.01 to 0.5 μm. Since these two different kinds of silica particles have different peaks in their particle size distribution curves, they can be clearly separated from each other. As fine projections derived from the inert particles are effectively formed, the each standard deviation of the particle diameters of the first and second silica particles is preferably 0.5 or less, respectively. The first silica particles have an average particle diameter 0.49 to 1.2 μm larger than that of the second silica particles.

In the present invention, when the average particle diameter of the first silica particles is smaller than 0.5 μm, the effect of improving the slipperiness and work efficiency of the film is unsatisfactory and when the average particle diameter of the first silica particles is larger than 2 μm, the film readily breaks due to reduced break strength. When the average particle diameter of the second silica particles is smaller than 0.01 μm, the effect of improving the slipperiness and work efficiency of the film becomes unsatisfactory and when the average particle diameter of the second silica particles is larger than 0.8 μm, the surface of the film becomes too rough.

The centerline average surface roughness of the biaxially oriented polyester film containing the first and second silica particles is preferably in the range of 6 to 100 nm. When the average surface roughness of the film is lower than 6 nm, sufficient slipperiness is hardly obtained and it is difficult to wind up the film. When the centerline average surface roughness of the film is higher than 100 nm and high-speed printing is carried out with a thermal transfer printer, thermal conductivity may deteriorate and printed characters may become unclear. By containing two different kinds of silica particles having different average particle diameters, a space factor of a practical level can be provided to a film even when a surface of the film has a small number (50/cm$^2$ or less) of large projections having a height of 1.5 μm or, more, thereby making it possible to ensure the high work efficiency of the film.

The average particle diameters of the first and second silica particles may be larger than the thickness of the film unless the height of the projections is outside the above range.

In the present invention, the amounts of the first and second silica particles are 0.1 to 2 wt % and 0.05 to 2 wt % based on the weight of the polyester, respectively. When the amount of the first silica particles is smaller than 0.1 wt %, the slipperiness and work efficiency of the film become unsatisfactory and when the amount of the first silica particles is larger than 2 wt %, the surface roughness and space factor of the film become excessive, thereby reducing the break strength of the film. When the amount of the second silica particles is smaller than 0.05 wt %, the slipperiness and work efficiency of the film become unsatisfactory and when the amount is larger than 2 wt %, the space factor becomes excessive.

The polyester containing two different kinds of silica particles dispersed therein can be produced by adding the silica particles (preferably a slurry contained in glycol) to a reaction system during a polymer polymerization reaction, for example, at any time during an ester exchange reaction or a polycondensation reaction in the case of the ester exchange method. The silica particles are preferably added at the beginning of a polymerization reaction, for example, before the intrinsic viscosity becomes about 0.3.

The polyester containing two different kinds of silica particles may further contain a lubricant having a particle diameter smaller than the above two different kinds of silica particles as a third component besides the above two different kinds of silica particles and optionally additives such as a stabilizer, dye, ultraviolet light absorber and flame retardant besides the silica particles.

Further, when the first inert inorganic particles are calcium carbonate particles, both calcium carbonate and aluminum silicate are preferably contained. As fine projections derived from these inert particles are existent on the surface of the film, the film has excellent work efficiency and a suitable space factor.

The calcium carbonate has an average particle diameter of preferably 0.5 to 4.0 μm, more preferably 0.5 to 2.0 μm. When the average particle diameter of calcium carbonate is smaller than 0.5 μm and the film is wound round a master roll or product roll, air squeezability (contained air is hardly squeezed out) becomes unsatisfactory, thereby often forming wrinkles, and the slipperiness of the film becomes unsatisfactory, thereby reducing the work efficiency of the processing step. When the average particle diameter of calcium carbonate is larger than 4.0 μm, the surface of the film becomes too rough, thereby increasing the space factor, reducing printability and causing a break more often. The average particle diameter of calcium carbonate may be larger than the thickness of the film.

The amount of calcium carbonate must be 0.1 to 2 wt %, preferably 0.1 to 1 wt % based on the polyester. When the amount of calcium carbonate is smaller than 0.1 wt %, air squeezability at the time of winding up the film becomes unsatisfactory and when the amount of calcium carbonate is larger than 2 wt %, the surface of the film becomes too rough and printed characters become unclear due to the low heat conductivity of the film if high-speed printing is carried out with a heat-sensitive transfer ribbon produced from the film by a thermal transfer printer.

Any calcium carbonate may be used in the present invention, such as naturally produced limestone, chalk, calcite crystal such as precipitated calcium carbonate produced from limestone by a chemical method, algodonite crystal obtained by reacting carbonic acid gas with milk of lime at a high temperature, vaterite crystal or a combination thereof. Ground calcium carbonate (calcite crystal) obtained by mechanically grinding limestone may also be used.

Aluminum silicate has an average particle diameter of 0.1 to 2.0 μm, preferably 0.3 to 1.2 μm and is contained in an amount of 0.05 to 1 wt %. When the average particle diameter of aluminum silicate is smaller than 0.1 μm or the content of aluminum silicate is lower than 0.05 wt %, the slipperiness of the film is impaired, thereby reducing work efficiency and when the average particle diameter of aluminum silicate is larger than 2.0 μm or the content of aluminum silicate is higher than 1 wt %, the surface of the film becomes rough, whereby the space factor is apt to become excessive. The aluminum silicate used in the present invention is a lamellar aluminum silicate such as kaolin clay obtained from naturally produced kaolin mineral or the like. Further, kaolin clay may be cleaned by rinsing.

The biaxially oriented polyester film of the present invention may contain other particles as a third component in addition to the calcium carbonate and aluminum silicate particles. In this case, the other particles preferably have an average particle diameter which falls within the range of average particle diameter of the above calcium carbonate or aluminum silicate and is smaller than the average particle diameters of the contained calcium carbonate and aluminum silicate.

As for the time of adding the above calcium carbonate and aluminum silicate to the polyester, they may be added before or during the polymerization of the polyester, may be kneaded in an extruder when pelletized after the end of polymerization, or added and dispersed in the extruder when they are melt extruded into a sheet form. Out of these, they are preferably added before polymerization because a uniform dispersion state is easily obtained. Addition of calcium carbonate and aluminum silicate to the polyester may be carried out by a method known per se. For example, when they are to be added before the polymerization of PEN, calcium carbonate and aluminum silicate are added to ethylene glycol and dispersed into the polymer by ultrasonic vibration or the like.

Other Components

The polyester of the present invention preferably contains a sulfonic acid quaternary phosphonium salt in an amount of 0.05 to 40 mmol % based on the total of all the carboxylic acid components. The sulfonic acid quaternary phosphonium salt is contained in a such a state that it is bonded to the polymer chain of the polyester or contained in the polyester in such a state that it is not bonded to the polymer chain but blended. In general, it is contained in the former state.

To contain the sulfonic acid quaternary phosphonium salt in the polyester, a sulfonic acid quaternary phosphonium salt compound having an ester forming functional group is preferably used.

The sulfonic acid quaternary phosphonium salt compound having an ester forming functional group is preferably a compound represented by the following formula:

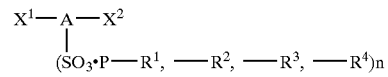

wherein A is an aliphatic or aromatic group having 2 to 18 carbon atoms and a valence of n+2, $X^1$ and $X^2$ are the same or different and each a hydrogen atom or ester forming functional group, n is 1 or 2, and $R^1$, $R^2$, $R^3$ and $R^4$ are the same or different and each an alkyl group having 1 to 18 carbon atoms, benzyl group or aryl group having 6 to 12 carbon atoms, with the proviso that $X^1$ and $X^2$ cannot be both a hydrogen atom.

In the above formula, A is an aliphatic or aromatic group having 2 to 18 carbon atoms and a valence of n+2, for example, 3 (when n=1) or 4 (when n=2). The aliphatic group is preferably a linear or branched, saturated or unsaturated hydrocarbon group having 2 to 10 carbon atoms. The aromatic group is preferably an aromatic group having 6 to 18 carbon atoms, such as a tervalent or tetravalent benzene skeleton, naphthalene skeleton or biphenyl skeleton. The aromatic group may be substituted by an alkyl group having 1 to 12 carbon atoms besides $X^1$, $X^2$ and sulfonic acid quaternary phosphonium salt group.

$X^1$ and $X^2$ may be the same or different and each a hydrogen atom or ester forming functional group. When $X^1$ and $X^2$ are both a hydrogen atom, there is no group to be copolymerized into the polyester chain. $X^1$ and $X^2$ cannot be both a hydrogen atom and at least one of them must be an ester forming functional group. This ester forming functional group is, for example, a hydroxyl group, carboxyl group or ester forming derivative thereof.

Preferred examples of the above sulfonic acid quaternary phosphonium salt compound include tetrabutylphosphonium 3,5-dicarboxybenzene sulfonate, ethyltributylphosphonium 3,5-dicarboxybenzene sulfonate, benzyltributylphosphonium 3,5-dicarboxybenzene sulfonate, phenyltributylphosphonium 3,5-dicarboxybenzene sulfonate, tetraphenylphosphonium 3,5-dicarboxybenzene sulfonate, ethyltriphenylphosphonium 3,5-dicarboxybenzene sulfonate, butyltriphenylphosphonium 3,5-dicarboxybenzene sulfonate, benzyltriphenylphosphonium 3,5-dicarboxybenzene sulfonate, tetrabutylphosphonium 3,5-dicarbomethoxybenzene sulfonate, ethyltributylphosphonium 3,5-dicarbomethoxybenzene sulfonate, benzyltributylphosphonium 3,5-dicarbomethoxybenzene sulfonate, phenyltributylphosphonium 3,5-dicarbomethoxybenzene sulfonate, tetraphenylphosphonium 3,5-dicarbomethoxybenzene sulfonate, ethyltriphenylphosphonium 3,5-dicarbomethoxybenzene sulfonate, butyltriphenylphosphonium 3,5-dicarbomethoxybenzene sulfonate, benzyltriphenylphosphonium 3,5-dicarbomethoxybenzene sulfonate, tetrabutylphosphonium 3-carboxybenzene sulfonate, tetraphenylphosphonium 3-carboxybenzene sulfonate, tetrabutylphosphonium 3-carboxymethoxybenzene sulfonate, tetraphenylphosphonium 3-carboxymethoxybenzene sulfonate, tetrabutylphosphonium 3,5-di(β-hydroxyethoxycarbonyl)benzenesulfonate, tetraphenylphosphonium (β-hydroxyethoxycarbonyl)benzenesulfonate, tetrabutylphosphonium 3-(β-hydroxyethoxycarbonyl)benzenesulfonate, tetraphenylphosphonium 3-(β-hydroxyethoxycarbonyl)benzenesulfonate, tetrabutylphosphonium 4-hydroxyethoxybenzene sulfonate, bisphenol A-3,3'-di(tetrabutylphosphonium sulfonate), tetrabutylphosphonium 2,6-dicarboxynaphthalene-4-sulfonate and α-tetrabutylphosphonium sulfosuccinic acid. The above sulfonic acid quaternary phosphonium salt compounds may be used alone or in combination of two or more.

In general, the sulfonic acid quaternary phosphonium salt compounds may be easily produced from a reaction known per se between a corresponding sulfonic acid and a phosphine or a reaction known per se between a corresponding sulfonic acid metal salt and a quaternary phosphonium halide.

The amount of the above sulfonic acid quaternary phosphonium salt is preferably 0.05 to 40 mmol %, more preferably 0.1 to 20 mmol %, particularly preferably 0.3 to 10 mmol % based on the total of all the carboxylic acid components of the polyester. When the amount is smaller than 0.05 mmol %, interaction between inert inorganic particles becomes small and the film is easily chipped off while the film is carried. Also the electrostatic adhesion of the film to a cooling drum is hardly carried out properly. When the amount is larger than 40 mmol %, the interaction becomes too strong and the inert inorganic particles readily agglomerate disadvantageously.

Another AC volume resistance modifier, for example, tetraethylphosphonium hydroxide may be used. The amount of the modifier is preferably 0.05 to 40 mmol %, more preferably 0.1 to 20 mmol %, particularly preferably 0.3 to 10 mmol % based on the total of all the carboxylic acid components of the polyester like the sulfonic acid quaternary phosphonium salt.

The biaxially oriented polyester film of the present invention may optionally contain an antioxidant, thermal stabilizer, viscosity modifier, plasticizer, color improving agent, lubricant, nucleating agent, dye, ultraviolet light absorber and flame retardant in addition to the sulfonic acid quaternary phosphonium salt.

Biaxially Oriented Polyester Film

The biaxially oriented polyester film of the present invention preferably has a refractive index (nz) in the thickness direction of 1.495 or more. The upper limit of refractive index in the thickness direction is preferably 1.525. The refractive index in the thickness direction is more preferably in the range of 1.497 to 1.515. When the refractive index in the thickness direction is lower than 1.495, delamination readily occurs in the case of a polyethylene-2,6-naphthalene dicarboxylate film, and a break and the separation of a surface layer may occur during processing or use. In order to obtain a film which has a refractive index (nz) in the thickness direction of 1.495 or more and can stand practical use, the film must be formed by simultaneous biaxial orientation.

The biaxially oriented polyester film used in the present invention has a specific relationship between heat shrinkage factor (may be abbreviated as HS hereinafter) (%) in the longitudinal direction of the film when treated at 200° C. for 10 minutes and F-5 value (N/mm$^2$) which is a load at an elongation of 5% in an elongation-load curve in the longitudinal direction of the film measured at 23° C., that is, a value obtained by dividing HS by the F-5 value of 0.028 or less, preferably 0.026 or less. When the value obtained by dividing HS by the F-5 value is larger than 0.028, HS becomes too large or the F-5 value becomes too small. In the former case, the film which is the base film of a ribbon shrinks or wrinkles by the heat of the thermal head, resulting in color mis-registration or image distortion at the time of printing. In the latter case, the Young's modulus in the longitudinal direction of the film becomes insufficient, whereby elongation deformation may occur in the film by tension applied at the start or stop of printing, or the film wrinkles or breaks by tension in the printer. The lower limit value obtained by dividing HS by the F-5 value is preferably at least 0.01 in order to maintain film forming properties.

The heat setting temperature is preferably increased to reduce HS. A simultaneous biaxial stretching machine which can relax the film in the longitudinal direction at the time of heat setting it is particularly preferably used. The draw ratio in the longitudinal direction is preferably raised to increase the F-5 value. HS is preferably in the range of 0 to 7%. The F-5 value is preferably at least 10 N/mm$^2$, more preferably 10 to 25 N/mm$^2$. To achieve these HS, F-5 value and refractive index in the thickness direction at the same time, simultaneous biaxial orientation is needed. Particularly preferably, PEN is biaxially stretched simultaneously to obtain a biaxially oriented polyester film.

The biaxially oriented polyester film of the present invention has a Young's modulus (elastic modulus in tension) in the longitudinal direction of 200 N/mm$^2$ or more, an F-1 value in the longitudinal direction of 2.5 N/mm$^2$ or more and an F-5 value in the longitudinal direction of 10 N/mm$^2$ or more at 190° C. and an F-5 value in the longitudinal direction of 100 N/mm$^2$ or more at 23° C. The F-1 value is a stress at an elongation of 1% and the F-5 value is a stress at an elongation of 5%.

When the film has an elastic modulus in tension in the longitudinal direction at 190° C. of less than 200 N/mm$^2$, an F-1 value in the longitudinal direction of less than 2.5 N/mm$^2$ or an F-5 value in the longitudinal direction of less than 10 N/mm$^2$ and the temperature of the film rises by the heat of the thermal head at the time of printing or in the processing step, the film may elongate by conveyance tension. When elongation occurs at the time of processing, the film becomes thin and wrinkles in the longitudinal direction, thereby making it difficult to obtain a normal product. When a heat-sensitive transfer ribbon elongates at the time of printing, image distortion or color mis-registration readily occurs, thereby deteriorating image quality.

When the F-5 value in the longitudinal direction of the film at 23° C. is smaller than 100 N/mm$^2$, the base film may elongate by tension at the time of start or stop of the ribbon.

Upper limit values are not particularly specified for these characteristic properties but it is extremely difficult to set the Young's modulus in the longitudinal direction at 190° C. to more than 800 N/mm$^2$, the F-1 value in the longitudinal direction to more than 7 N/mm$^2$ and the F-5 value in the longitudinal direction at 190° C. to more than 25 N/mm$^2$ and the F-5 value in the longitudinal direction at 23° C. to more than 200 N/mm$^2$.

Preferably, the above biaxially oriented polyester film has a heat shrinkage factor in the longitudinal direction and the transverse direction of 7% or less when it is heated at 200° C. for 10 minutes.

More preferably, the difference between heat shrinkage factors in the longitudinal direction and the transverse direction at 200° C. for 10 minutes at positions 1 m away from each other in the transverse direction of the film is 0.3% or less in either direction. When the heat shrinkage factor in the longitudinal direction or the transverse direction is higher than 7%, the film wrinkles at the time of printing, resulting in the distortion or partial loss of an image. When the difference between the heat shrinkage factors is larger than 0.3% in any one of the longitudinal direction and the transverse direction, the flatness of the film deteriorates during processing and the film easily wrinkles. This heat shrinkage factor is preferably as close to 0% as possible if there are no other disadvantages such as flatness.

The thickness of the biaxially oriented polyester film of the present invention is preferably 0.5 to 10 μm. When the thickness is larger than 10 μm, the conduction of heat takes time at the time of printing which is disadvantageous for high-speed printing. When the thickness is smaller than 0.5 μm, the film has low tension and poor processability and cannot retain required strength as a ribbon.

The polyester of the biaxially oriented film of the present invention preferably has an AC volume resistivity in a molten state of 60×10$^8$ Ωcm. When the AC volume resistivity is no more than 60×10$^8$ Ωcm, a sufficient amount of charge can be provided to adhere the polyester extruded in a molten state from a melt extruder to a cooling drum at the time of forming a film, thereby making it possible to allow for stable film formation without reducing thickness uniformity. To set the AC volume resistivity to that value, a sulfonic acid quaternary phosphonium salt is preferably added to the polyester.

In a continuous thickness chart obtained by continuously measuring the thickness of the biaxially oriented polyester film of the present invention, the difference in height between adjacent mountain and valley (thickness difference) in the longitudinal direction and the transverse direction is 8% or less, preferably 5% or less, more preferably 3% or less of the average thickness. When the thickness difference is larger than 8% of the average thickness, the quantity of heat received from the thermal head of the printer changes according to thickness difference and may cause printing nonuniformity. In the above continuous thickness chart, the interval between the mountain and the valley is preferably 10 cm or more because printing nonuniformity can be suppressed. Further, in the above continuous thickness chart, thickness nonuniformity (a value obtained by dividing the maximum thickness difference obtained by subtracting the minimum thickness from the maximum thickness by average thickness) is preferably 10% or less, more preferably 8% or less. When the thickness nonuniformity is 10% or less, a film extremely uniform in thickness is obtained, whereby there can be obtained an excellent effect that no coating speck is produced when an adhesive is applied or when a dye is applied.

(i) When the biaxially oriented polyester film of the present invention contains porous silica particles and second silica particles as the inert inorganic particles, its centerline average surface roughness (SRa) and 10-point average surface roughness (SRz) are preferably 10 to 80 nm and 700 to 1,500 nm, respectively. When this centerline surface roughness (SRa) is lower than 10 nm or the 10-point average surface roughness (SRz) is lower than 700 nm, the slipperiness of the film is apt to deteriorate disadvantageously. When the centerline average surface roughness (SRa) is higher than 80 nm or the 10-point average surface roughness (SRz) is higher than 1,500 nm, windability is apt to deteriorate disadvantageously. This surface roughness can be adjusted by adding the above inert particles.

(ii) It is preferred that when the biaxially oriented polyester film contains the first silica particles and the second silica particles as the inert inorganic particles, it should have a large number of projections derived from the above two different kinds of silica particles on the surface and 50 or less projections having a height of 1.5 μm or more should be extent per cm$^2$. When the number of projections having a height of 1.5 μm or more is 50 or less per cm$^2$, voids formed around the silica particles can be made small in size and number, thereby making it possible to suppress a break during the formation of a film or a break during the stretching of the film. It is also preferred that the surface properties of the biaxially oriented polyester film of the present invention should be modified by the above two different kinds of silica particles and that the centerline average surface roughness (SRa) and 10-point average surface roughness (SRz) of the film should be 6 to 100 nm and 500 to 1,700 nm, respectively. When the centerline average surface roughness (SRa) is lower than 6 nm or the 10-point average surface roughness (SRz) is lower than 500 nm, the slipperiness of the film is apt to deteriorate. When the centerline average surface roughness (SRa) is higher than 100 nm or the 10-point average surface roughness (SRz) is higher than 1,700 nm, windability is apt to degrade.

(iii) Further, when the biaxially oriented polyester film of the present invention contains calcium carbonate particles and aluminum silicate particles as the inert inorganic particles, it preferably has fine projections derived from the calcium carbonate and aluminum silicate on the surface and a centerline average surface roughness (Ra) of 10 to 40 nm. When the centerline average surface roughness of the film is lower than 10 nm, sufficient slipperiness is hardly obtained and it may be difficult to wind up the film. When the centerline average surface roughness is higher than 40 nm and high-speed printing is carried out with a thermal transfer printer, printed characters may become unclear due to low heat conductivity.

The frequency of projections having a height of 1.5 μm or more on the surface of this biaxially oriented polyester film is preferably in the range of 300 to 700 per cm². When the frequency of the projections having a height of 1.5 μm or more is lower than 300 per cm², the interval between adjacent projections becomes large, whereby a film having poor slipperiness with a flat surface is easily obtained. When the frequency of the projections having a height of 1.5 μm or more is higher than 700 per cm², the surface of the film becomes too rough and a break may often occur during the formation of a film or during the stretching of the film due to voids formed around the fine particles contained.

The space factor of this biaxially oriented polyester film is preferably in the range of 1 to 19%. When the space factor is less than 1%, the slipperiness and handling properties of the film are apt to become unsatisfactory and when the space factor is more than 19%, the surface becomes too rough, which may cause a break.

Biaxially Oriented Polyester Film Forming Method

The biaxially oriented polyester film of the present invention must be produced by simultaneous biaxial orientation. The stretching unit for the longitudinal direction of a simultaneous biaxial stretching machine is available in a conventional screw type in which the clip interval is expanded while clips are placed in the grooves of a screw and a pantograph type in which the clip interval is expanded by using a pantograph. The simultaneous biaxial stretching machines of these types involve problems that the film forming speed is low and that conditions such as draw ratio cannot be easily changed. When a user has such equipment, it can be used for the production of the above biaxially oriented polyester film. A linear motor type simultaneous biaxial tenter has been developed and is now attracting much attention for its high film forming speed. This linear motor type simultaneous biaxial orientation can solve the above problems at the same time. Therefore, when a simultaneous biaxial stretching machine is to be newly introduced, it is recommended to use this type of equipment. Since a longitudinal stretching roller is not used in simultaneous biaxial orientation unlike sequential biaxial orientation, the film surface has fewer scratches. In addition, the plane of the benzene ring or naphthalene ring of the polyester tends to be parallel to the film plane, the refractive index nz in the thickness direction becomes small, the tear propagation resistance is small, and delamination easily occurs in sequential biaxial orientation. However, these are improved by simultaneous biaxial orientation. A biaxially oriented polyester film having a structure which can be relaxed in the longitudinal direction in a heat setting area can have a much lower heat shrinkage factor (HS) in the longitudinal direction at 200° C. Since these features agree with the requirements for a heat-sensitive transfer ribbon, simultaneous biaxial orientation must be carried out in the present invention.

The term "simultaneous biaxial orientation" as used herein means orientation for aligning in both longitudinal and transverse directions of a film at the same time, that is, the operation of stretching the film in both longitudinal and transverse directions while it is carried by holding both ends of the film with a clip using a simultaneous biaxial stretching machine. The longitudinal direction of the film is the lengthwise direction and the transverse direction is the breadthwise direction of the film. As a matter of course, the film may have a portion which is stretched in both longitudinal and transverse directions at the same time. Therefore, a method in which a film is stretched in both longitudinal and transverse directions at the same time after it is stretched in a transverse direction or longitudinal direction and a method in which a film is further stretched in a transverse direction or longitudinal direction after it is stretched in biaxial directions at the same time are included in the scope of the present invention.

To produce the polyester film of the present invention, after specific inert fine particles are contained in the polyester, a film-like molten product melt extruded at a normal extrusion temperature, that is, a temperature of the melting point (to be expressed as "TM" hereinafter) to $(Tm+70)°$ C. is quenched on the surface of a rotary cooling drum to obtain an unstretched film having an intrinsic viscosity of 0.40 to 0.90 dl/g. In the case of PEN, drying is carried out at 170° C. for 6 hours, the extrusion temperature is around 300° C., and the surface temperature of the cooling drum is about 60° C. For this step, there is known an electrostatic adhesion method in which static charge is applied to the film-like molten product in order to improve adhesion between the film-like molten product and the rotary cooling drum. Since the molten product of the polyester has high electric resistance, the above electrostatic adhesion may become unsatisfactory. To cope with this, it is preferred that a sulfonic acid quaternary phosphonium should be contained in the polyester in an amount of 0.05 to 40 mol % based on the total of all the carboxylic acid components.

Thereafter, this unstretched film is introduced into a simultaneous biaxial stretching machine by clipping the both ends of the film to be heated at a temperature of (Tg of polyester−10) to $(Tg+70)°$ C. in a preheating zone, biaxially stretched at an area draw ratio of 10 to 40 times in one stage or multiple stages simultaneously, and then biaxially stretched at an area draw ratio of 2 to 5 times in one stage or multiple stages simultaneously at a temperature of (Tm (melting point of polyester)−120) to $(Tm−10)°$ C. Subsequently, the film is heat set at (Tm−70) to $(Tm)°$ C. at a fixed length and then relaxed by 1 to 10% in longitudinal and transverse directions, preferably each direction at 100 to 200° C. before it is cooled. In the case of PEN, preferably, the preheating temperature is around 140° C., the stretching temperature is about 145° C., and the heat setting temperature is about 235° C. Thereafter, the film is cooled to room temperature while it is relaxed in both longitudinal and transverse directions if necessary and wound up to obtain a simultaneously biaxially oriented polyester film of interest.

In the present invention, to provide surface properties such as adhesion, slipperiness, releasability and antistatic properties to the film, a coating may be preferably applied to the surface of the polyester film before or after simultaneous biaxial orientation.

In order to use the biaxially oriented polyester film of the present invention in a heat-sensitive transfer ribbon, for example, it preferably has a coating layer of at least one water-soluble or water-dispersible resin selected from the group consisting of polyesters modified by urethane, polyester, acrylic or vinyl-based resin on the surface to be coated with an ink layer of the polyester film. This coating layer serves to improve adhesion between the polyester film and the ink layer comprising a subliming dye and a resin binder.

Thermal Transfer Ink Layer

When the biaxially oriented polyester film of the present invention is used in a heat-sensitive transfer ribbon, the thermal transfer ink layer is not limited to a particular kind and any known thermal transfer ink layer may be used. That is, the thermal transfer ink layer comprises a binder component and a coloring component as main components and optionally suitable amounts of a softener, plasticizer and dispersant. Illustrative examples of the binder component as a main component include known celluloses and waxes such as carnauba wax and paraffin wax, polyvinyl alcohols, partially acetalized products of polyvinyl alcohols, polyamides, and polymer materials having a low melting point. A colorant comprising carbon black as the main component and a dye, or an organic or inorganic pigment is used. The thermal transfer ink layer may contain a subliming dye. Examples of the subliming dye include dispersion dyes and basic dyes.

To form the thermal transfer ink layer on the surface (the surface of an adhesive layer when the adhesive layer is formed) of the biaxially oriented polyester film, a known technique, for example, hot melt coating or solution coating using a solvent such as gravure coating, reverse coating or slit die coating may be used.

Fusion Prevention Layer

A conventionally known or used fusion prevention layer may be formed on one side devoid of a thermal transfer ink layer of the biaxially oriented polyester film for use in a heat-sensitive transfer ribbon to prevent the biaxially oriented polyester film from sticking to the thermal head. Further, a fusion layer containing a polyurethane obtained from a polyol (such as a polyalcohol) and a polyisocyanate compound and a phosphoric acid polyester-based compound as a surfactant is preferably formed. Preferred examples of the polyol forming this polyurethane include polyalcohols such as polyvinyl butyral resin having a hydroxyl group, polyester resin, polyether resin, polybutadiene resin, acryl polyol, nitrocellulose resin, cellulose acetate resin, cellulose acetate resin, and urethane and epoxy prepolymers. Moreover, a fusion prevention layer is formed on an unstretched film or a biaxially oriented film after it is wound up. Thereby, the heat history of the film base from the thermal head can be reduced after it is processed into a heat-sensitive transfer ribbon advantageously.

EXAMPLES

The following examples are given to further illustrate the present invention. Various physical properties and characteristic properties in the present invention were measured and defined as described below. "Parts" in examples means parts by weight.

(1) Average Particle Diameter of Particles

The diameter of each particle was measured with the CP-50 centrifugal particle analyzer of Shimadzu Corporation. There was prepared a cumulative curve from individual diameters of particles and the amounts thereof which were calculated on the basis of the resultant centrifugal sedimentation curve, and the diameter of a particle corresponding to a 50 mass percent was read from the cumulative curve and taken as the above average particle diameter (see "Particle Size Measuring Techniques" pages 242–247, 1975, issued by Nikkan Kogyo Press).

(2) Particle Diameter of Particles Contained in Film

A small piece of a sample film was fixed on the sample table of a scanning electron microscope to ion etch the surface of the film by the sputtering apparatus of JEOL Ltd. (JIS-1100 ion sputtering apparatus) under a vacuum of $1\times10^{-3}$ torr at 0.25 kV and 1.25 mA for 10 minutes and sputtered with gold by the same apparatus. This sample film was observed at a magnification of 10,000 to 30,000× through the scanning electron microscope to obtain the area equivalent particle diameters (Di) of at least 100 particles by the Luzex 500 of Nippon Regulator Co., Ltd. The number average value of the area equivalent particle diameters (Di) represented by the following equation (1) was taken as an average particle diameter (D).

$$D = \left(\sum_{i=1}^{n} Di\right)/n \qquad (1)$$

(3) Average Particle Diameter when Inert Particles are Agglomerated Particles

When the inert particles added were second particles which are agglomerates of primary particles, the particle diameter obtained by measuring the average particle diameter by the method shown in (1) may be smaller than the actual average particle diameter. Therefore, the following method was employed.

A super-thin piece having a thickness in the sectional direction of 100 nm was cut out from a film containing particles to observe agglomerated particles (secondary particles) at a magnification of 10,000× through a transmission electron microscope (for example, JEM-1200EX of JEOL Ltd.). The circle area equivalent diameters of 1,000 particles were measured from this photomicrograph by an image analyzer or the like and averaged to obtain an average secondary particle diameter. The identification of the type of particles can be carried out by the quantitative analysis of a metal element with SEM-XMA or ICP. The average primary particle diameter was measured in the same manner as the average secondary particle diameter except that the magnification of the transmission electron microscope was set to 100,000 to 1,000,000×.

(4) Film Thickness and Thickness Nonuniformity

The thickness of the sample film was measured over a length of 5 m in the longitudinal direction and 1 m in the transverse direction of the sample film by the electron micrometer (K-312A) of Anritsu Corporation at a needle pressure of 30 g and a traveling speed of 25 mm/sec to obtain a continuous thickness chart. The maximum thickness, minimum thickness and the difference in thickness between adjacent mountain and valley were read from this chart. The width (cm), length (cm), weight (g) and density (g/cm) of the same sample were measured to calculate an average thickness ($\mu$m) from the following equation (2). The ratio of the difference between the maximum thickness and the minimum thickness to the average thickness was calculated from the following equation (3) and taken as thickness nonuniformity, and the ratio of the difference in thickness between adjacent mountain and valley to the average thickness was calculated from the following equation (4).

$$\text{Average thickness } (\mu m) = [(\text{weight}/\text{width} \times \text{length} \times \text{density})] \times 10,000 \quad (2)$$

$$\text{Thickness nonuniformity } (\%) = [(\text{maximum thickness} - \text{minimum thickness})/\text{average thickness}] \times 100 \quad (3)$$

$$\text{Ratio of difference in thickness between adjacent mountain and valley to average thickness} = [(\text{thickness of mountain} - \text{thickness of valley})/\text{average thickness}] \times 100 \quad (4)$$

(5) Surface Roughness (Centerline Average Roughness, Ra)

The front and rear surfaces of a sample film were measured for centerline average roughness (Ra) with a surface roughness tester (Surfcom 111A of Tokyo Seimitsu Co., Ltd.) to calculate an average value thereof as surface roughness.

(6) Space Factor (SF)

A 10 cm square (area of 100 cm$^2$) was cut out from the sample film, and the gravimetric thickness $t_1$ ($\mu$m) was obtained from the weight w (g) and density d (g/cm$^3$) of the cut sample. Ten of the 10 cm square cut out from the sample film were assembled together to obtain the thickness $t_2$ ($\mu$m) of one square with a micrometer in order to calculate a space factor from the following equation (5).

$$SF(\%) = 100 - (t_1/t_2) \times 100 \quad (5)$$

(7) Number of Projections Having a Height of 0.8 $\mu$m or More

The projection profile on the surface of the film was measured by using a non-contact 3-D roughness meter (ET30HK of Kosaka Kenkyusho Co., Ltd.) with a light feeler having a beam diameter of 1.6 $\mu$m and a semiconductor laser having a wavelength of 780 nm at a measurement length (LX) of 1 mm, a sampling pitch of 2 $\mu$m, a cut-off of 0.25 mm, a magnification in the longitudinal direction of 10,000×, a magnification in the transverse direction of 200× and 100 scanning lines (therefore, measurement length in Y direction=0.2 mm) to obtain the number of projections having each height (per mm$^2$).

(8) Number of Projections Having a Height of 1.5 $\mu$m or More

The height of each projection was calculated by using the OPTIPHOTO double-beam microscope (wavelength $\lambda$=546 nm) of NIKON Corporation, making use of the fact that the interference fringe is 2/$\lambda$, to count projections having a height of 1.5 $\mu$m or more per cm$^2$. This was made on the front and rear sides of the sample film, and the average value of the measurement data was calculated and taken as the number of projections having a height of 1.5 $\mu$m or more.

(9) Refractive Index (nz) in Thickness Direction

The refractive index in the thickness direction of the film was measured by an Abbe refractometer (of Atago KK) using a Na-D line as a light source at 25° C.

(10) Heat Shrinkage Factor

After a 30 cm×30 cm sample film whose length has been measured accurately was suspended in an oven set to 200° C. and maintained at that temperature under no load for 10 minutes, it was taken out from the oven and returned to room temperature to measure its dimensional change. The heat shrinkage factor is defined by the following equation (6).

$$\text{Heat shrinkage factor} = (\Delta L/L_0) \times 100 \ (\%) \quad (6)$$

$$\Delta L = |L_0 - L|$$

$L_0$ is the length of the film before the heat treatment, and L is the length in the same direction of the film after the heat treatment. The heat shrinkage factor is the average value of 10 samples in the vertical (longitudinal) direction of the film.

(11) F-5 Value

A strip-like test sample (150 mm in length×10 mm in width) cut out from the sample film in the longitudinal direction was fixed between chucks 100 mm away from each other in a chamber maintained at a temperature of 23° C. and a relative humidity of 50% using a tensile tester (ORIENTEC TENSILON TC-100). The test film sample was pulled at a rate of 100 mm/min to obtain a load-elongation curve (stress-distortion curve) on a chart. A load at an elongation of 5% was obtained from this curve and taken as an F-5 value.

(12) Measurement of Volume Resistivity of Film

This was measured by using an apparatus shown in FIG. 1. A measurement sample 1 was obtained by assembling films until the total thickness became about 150 $\mu$m. An upper electrode 3 having a diameter of 5.6 cm and a thickness of 0.2 cm was placed on top of a cylindrical lower electrode 2 having a diameter of 20 cm in such a manner that a parallel interval of 150 $\mu$m could be maintained between them, and the measurement sample 1 was inserted between the electrodes such that it closely adhered to the electrodes.

The lower electrode incorporated an electricity application device 4 and a temperature detecting terminal 5 and was constituted to ensure that a variation in the surface temperature of the measurement surface of the lower electrode was 1° C. or less and that the temperature difference between the measurement surface of the lower electrode and the detection terminal was 2° C. or less at a temperature elevation rate of 8° C./min. The detection temperature was measured by a read thermometer 7. All the electrodes were placed in a heat insulating box 11. A power supply 8 applies its generated voltage between the electrodes through a standard resistor 9 and generates 100 V at 50 Hz. As for a current running in this circuit, voltage generated at both ends of the standard resistor 9 was read by an electron meter 10 having an internal impedance of 100 M$\Omega$ or more. Numeral 6 in the figure denotes a transformer.

The AC volume resistivity of the molten film in the present invention was measured by the above apparatus when the rising temperature measurement rate of the lower electrode was 8° C./min and the electrode had a temperature of (melting point of polymer measured by DSC)+20° C. (290° C. in the case of polyethylene-2,6-naphthalene dicarboxylate). The AC volume resistivity Z can be obtained from application voltage E, current I, electrode area S and electrode interval d based on the following equation (7).

$$Z = (E/I) \times (S/d) \quad (7)$$

(13) Delamination Resistance (Fold Delamination Whitening Ratio)

A square (80 mm×80 mm) piece was cut out from the sample film and folded into two by hand softly to make a fold by placing opposite sides one upon the other. This folded sample film was sandwiched between a pair of flat metal plates and pressed by a press at a predetermined pressure $P_1$ (kgf/cm$^2$) for 20 seconds. Thereafter, the fold of the folded sample film taken out from between the metal plates was smoothed down by hand to restore its original flat state. Then, the sample film was sandwiched between the metal plates and pressed at a pressure $P_1$ (kgf/cm$^2$) for 20 seconds again. Thereafter, the sample film was taken out from between the metal plates and the length of a whitened portion which appeared on the fold was measured by a microscope. The measurement of the length (mm) of the whitened portion was carried out by using a new sample film each time for 6 different pressures $P_1$ (1, 2, 3, 4, 5 and 6 (kgf/cm$^2$)). The average value of the total lengths of whitened portions at each pressure was obtained and the ratio of this value to the total length of the fold (80 mm) was taken as a fold delamination whitening ratio. This ratio is used as an index showing the incidence rate of delamination of the film. It can be said that the lower this fold delamination whitening ratio the higher the delamination resistance becomes.

(14) Film Forming Properties or Windability

The film forming state of the formed base film was observed until it was slit to a predetermined width and evaluated based on the following criteria.

Rank A: extremely stable slitting and winding are possible with a break or wrinkling frequency of 0 to 1 time per day
Rank B: stable slitting and winding are possible with a break or wrinkling frequency of 2 to 4 times per day
Rank C: stable slitting and winding are impossible with a break or wrinkling frequency of 5 to 7 times per day
Rank D: stable slitting or winding is not expected because the break and wrinkling frequency is 8 times or more per day and extremely large wrinkles are formed

(15) Chipping Resistance

The form of a rolled film was observed and evaluated based on the following criteria.

Rank A: foreign matter is not contained in the rolled film by chipping
Rank B: foreign matter is rarely contained in the rolled film by chipping
Rank C: foreign matter is sometimes contained in the rolled film by chipping
Rank D: a large amount of foreign matter is contained in the rolled film by chipping

(16) Printability

Printing was made on the VY.200 image receiving sheet (standard paper of Hitachi, Ltd.) by the Hitachi VY.200 printer (of Hitachi, Ltd.) to the maximum optical density. The produced heat-sensitive transfer ribbon was evaluated for printability and wrinkles formed on the ribbon based on the following criteria.

○: clear printing is possible
Δ: printing density does not become uniform
×: printing is carried out improperly due to wrinkled ribbon Example 1

0.03 part of manganese acetate tetrahydrate was added to a mixture of 100 parts of dimethyl 2,6-naphthalene dicarboxylate and 60 parts of ethylene glycol to carry out an ester exchange reaction by gradually increasing the temperature from 150° C. to 240° C. When the reaction temperature reached 170° C., 0.024 part of antimony trioxide was added and porous silica fine particles and spherical silica particles having a particle diameter shown in Table 1 were added in amounts shown in Table 1, and when the reaction temperature reached 220° C., 0.021 part (1 mmol %) of tetrabutylphosphonium 3,5-dicarboxybenzene sulfonate was added. The ester exchange reaction was continued, and 0.023 part of trimethyl phosphate was added after the end of the ester exchange reaction. Thereafter, the reaction product was transferred to a polymerization reactor and heated at 290° C. to carry out a polycondensation reaction under a high vacuum of 0.2 mmHg or less to obtain polyethylene-2,6-naphthalene dicarboxylate polymer having an intrinsic viscosity measured in an o-chlorophenol solution at 25° C. of 0.61 dl/g.

This polymer was melt extruded into a sheet form by an extruder and a T die and adhered to a water-cooling casting drum at a rate of 37.5 m/min to be solidified by cooling in order to obtain an unstretched sheet. The following coating composition 1 as an adhesive layer was applied to the side to be coated with an ink layer of this sheet with a gravure coater to a coating film thickness after drying of 0.1 μm. This unstretched film was introduced into a simultaneous biaxial stretching machine to be preheated at 140° C. and stretched to 4.5 times in the longitudinal direction and 3.9 times in the transverse direction at 145° C. simultaneously by holding it with clips. Thereafter, it was heat set at 200° C., 230° C. and 235° C. in first, second and third heat setting zones for 2 seconds each and relaxed by 3% in the longitudinal direction to obtain a biaxially oriented film having a thickness of 3.0 μm.

Coating composition 1 (acrylic resin+polyester resin+epoxy compound)

The coating 1 comprises an acrylic resin, polyester resin and epoxy compound and has the following composition.

The acrylic resin comprises 65 mol % of methyl methacrylate, 28 mol % of ethyl acrylate, 2 mol % of 2-hydroxyethyl methacrylate and 5 mol % of N-methylolacrylamide and is contained in the coating in an amount of 42 wt % in terms of a solid.

The polyester resin comprises 35 mol % of terephthalic acid, 13 mol % of isophthalic acid and 2 mol % of 5-sodium sulfoisophthalic acid as acid components and 45 mol % of ethylene glycol and 5 mol % of diethylene glycol as glycol components and is contained in the coating in an amount of 42 wt % in terms of a solid.

N,N,N',N'-tetraglycidyl-m-xylylenediamine is contained in the coating as an epoxy-based crosslinking agent in an amount of 6 wt % in terms of a solid and lauryl polyoxyethylene is contained in the coating as a wetting agent in an amount of 10 wt % in terms of a solid.

The characteristic properties of the obtained biaxially oriented polyester film were obtained.

The following coating composition 2 was applied to the side not to be coated with an ink layer as a fusion prevention layer with a gravure coater to a coating film thickness after drying of 0.5 μm and transfer ink having the following composition was applied to the adhesive surface with a gravure coater to a coating film thickness of 1.0 μm to produce a heat-sensitive transfer ribbon.

| Coating composition 2 | |
|---|---|
| Acrylic acid ester | 14.0 wt % |
| Amino-modified silicone | 5.9 wt % |
| Isocyanate | 0.1 wt % |
| Water | 80.0 wt % |
| (composition of thermal transfer ink) | |
| magenta dye (MSRedG) | 3.5 wt % |
| polyvinyl acetacetal resin | 3.5 wt % |
| methyl ethyl ketone | 46.5 wt % |
| toluene | 46.5 wt % |

The produced heat-sensitive transfer ribbon was evaluated for ink adhesion and printability. The evaluation results are shown in Table 1.

Comparative Example 1

An unstreched film was formed in the same manner as in Example 1. This unstretched film was preheated at 140° C. and stretched to 4.5 times in the longitudinal direction between high-speed and low-speed rollers under heating with an infrared heater. After the coating 1 in Example 1 as an adhesive layer was applied to the side to be coated with an ink layer with a gravure coater to a film coating thickness after drying of 0.1 μm, the unstretched film was stretched to 3.9 times in the transverse direction at 145° C. with a transverse stretching machine by holding it with clips and then heat set at 230° C. for 3 seconds to obtain a biaxially oriented polyester film having a thickness of 3.0 μm. Thereafter, a fusion prevention layer was formed in the same manner as in Example 1 to form an ink layer on the adhesive layer. The coating, ink and coating thickness were exactly the same as in Example 1.

The results obtained by evaluating the film in the same manner as in Example 1 are shown in Table 1. This film was inferior in printability with an extremely large HS/F5 value.

Thereafter, a fusion prevention layer and an ink layer were formed exactly in the same manner as in Comparative Example 1.

The results obtained by evaluating the film in the same manner as in Example 1 are shown in Table 1. This film was inferior in printability with an extremely large HS/F5 value.

TABLE 1

|  | Ex. 1 | C.Ex. 1 | C.Ex. 2 |
| --- | --- | --- | --- |
| Polyester | PEN | PEN | PET |
| Orientation | Simultaneous biaxial | Sequential biaxial | Sequential biaxial |
| Inert fine particles (1) | Porous silica | Porous silica | Porous silica |
| Average particle diameter (μm) | 1.6 | 1.6 | 1.6 |
| Amount (wt %) | 0.5 | 0.5 | 0.5 |
| Inert fine particles (2) | Spherical silica | Spherical silica | Spherical silica |
| Average particle diameter (μm) | 0.5 | 0.5 | 0.5 |
| Amount (wt %) | 0.25 | 0.25 | 0.25 |
| Quaternary phosphonium salt | A | A | A |
| Amount (mmol %) | 2 | 2 | 0.04 |
| Film thickness (μm) | 3.0 | 3.0 | 4.5 |
| Thickness nonuniformity (%) | 8 | 18 | 16 |
| HS/F5 | 0.0107 | 0.0297 | 0.0363 |
| Number of projections having a height of 0.8 μm or more (per mm$^2$) | 300 | 300 | 420 |
| Refractive index in thickness direction | 1.497 | 1.492 | 1.490 |
| Volume resistivity (10E8Ωcm) | 1 | 1 | 8 |
| Delamination test | 10 | 90 | 80 |
| Space factor | 15 | 15 | 15 |
| Productivity | A | A | C |
| Chipping resistance | A | B | B |
| Printability | ○ | x | x |

Ex. = Example
C.Ex. = Comparative Example
PEN: polyethylene-2,6-naphthalene dicarboxylate
PET: polyethylene terephthalate
A: tetrabutylphosphonium 3,5-dicarboxybenzene sulfonate
HS: heat shrinkage (%) in longitudinal direction at 200° C. for 10 minutes
F5: F5 value in longitudinal direction measured at 23° C.
Accepted when HS/F5 ≦ 0.028

Comparative Example 2

Polyethylene terephthalate having an intrinsic viscosity measured in o-chlorophenol at 25° C. of 0.61 dl/g was dried at 170° C. for 3 hours and molten by an extruder at 290° C. to obtain a molten product which was then extruded from a T die and quenched on a rotary cooling drum at 20° C. to obtain an unstretched film. This unstretched film was preheated at 115° C. and stretched to 4.2 times in the longitudinal direction between high-speed and low-speed rollers under heating with an infrared heater, and the coating 1 in Example 1 as an adhesive layer was applied to the side to be coated with an ink layer with a gravure coater to a coating film thickness after drying of 0.1 μm. Thereafter, the film was stretched to 3.8 times in the transverse direction with a transverse stretching machine at 120° C. by holding it with clips and then heat set at 220° C. for 3 seconds to obtain a biaxially oriented polyester film having a thickness of 4.5 μm.

Example 2

0.03 part of manganese acetate.tetrahydrate was added to a mixture of 100 parts of dimethyl 2,6-naphthalene dicarboxylate and 60 parts of ethylene glycol to carry out an ester exchange reaction by gradually increasing the temperature from 150° C. to 240° C. When the reaction temperature reached 170° C., 0.024 part of antimony trioxide was added and further inert fine particles (A) (spherical silica fine particles having an average particle diameter of 1.0 μm and a relative standard deviation of 0.10) and inert fine particles (B) (spherical silica fine particles having an average particle diameter of 0.3 μm and a relative standard deviation of 0.10) were also added in amounts of 0.2 wt % and 0.1 wt % based on polyester, respectively, and when the reaction temperature reached 220° C., 0.021 part (1 mmol %) of tetrabutylphosphonium 3,5-dicarboxybenzene sulfonate was added. The ester exchange reaction was continued, and 0.023 part of trimethyl phosphate was added after the end of the ester exchange reaction. Thereafter, the reaction product was transferred to a polymerization reactor and heated at 290° C. to carry out a polycondensation reaction under a high vacuum of 0.2 mmHg or less to obtain polyethylene-2,6-naphthalene dicarboxylate polymer having an intrinsic viscosity measured in an o-chlorophenol solution at 25° C. of 0.61 dl/g.

This polymer was molten by an extruder, extruded into a sheet form from a T die onto a water-cooling casting drum revolving at a rate of 37.5 m/min and then closely adhered to the surface of the drum to be solidified by cooling in order to obtain an unstretched sheet. The above coating composition 1 as an adhesive layer was applied to the side to be coated with an ink layer of the unstretched film with a gravure coater to a coating film thickness after drying of 0.1 μm. This unstretched film was introduced into a simultaneous biaxial stretching machine to be preheated at 140° C. and stretched to 5.4 times in the longitudinal direction and to 4.0 times in the transverse direction simultaneously at 145° C. by holding it with clips. Thereafter, it was heat set at 200° C. 230° C. and 235° C. in first, second and third heat setting zones for 2 seconds each to obtain a biaxially oriented film having a thickness of 3.0 μm.

The used solvents 1 and 2, the thermal transfer ink and their amounts were the same as in Example 1.

The characteristic properties of the obtained biaxially oriented polyester film are shown in Table 2.

Example 3

The procedure of Example 2 was repeated except that the inert particles were changed as shown in Table 2, the stretching temperature was changed to 140° C., the draw ratio in the longitudinal direction was changed to 5.1 times, and the draw ratio in the transverse direction was changed to 3.8 times. The characteristic properties of the obtained biaxially oriented polyester film are shown in Table 2.

Comparative Example 3

The procedure of Example 2 was repeated except that, after an unstretched film was preheated at 145° C. it was stretched to 5.4 times in the longitudinal direction between high-speed and low-speed rollers, the above coating 1 was applied to the side to be coated with an ink layer as an adhesive layer with a gravure coater to a coating film thickness after drying of 0.1 μm, and the film was stretched to 4.0 times in the transverse direction with a transverse stretching machine at 145° C. by holding it with clips and then heat set in a heat setting zone at 235° C. for 3 seconds to obtain a biaxially oriented polyester film having a thickness of 3.0 μm. The characteristic properties of the obtained biaxially oriented polyester film are shown in Table 2.

Comparative Example 4

The procedure of Example 2 was repeated except that the inert particles were changed as shown in Table 2. The characteristic properties of the obtained biaxially oriented polyester film are shown in Table 2.

TABLE 2

|  | Ex. 2 | Ex. 3 | C.Ex. 3 | C.Ex. 4 |
| --- | --- | --- | --- | --- |
| Polyester | PEN | PEN | PEN | PEN |
| orientation | Simultaneous biaxial | Simultaneous biaxial | Sequential biaxial | Simultaneous biaxial |
| Draw ratio in longitudinal direction | 5.4 | 5.1 | 5.4 | 5.4 |
| Draw ratio in transverse direction | 4.0 | 3.8 | 4.0 | 4.0 |
| Heat setting temperature (° C.) | 235 | 235 | 235 | 235 |
| Inert fine particles (A) | Spherical silica | Spherical silica | Spherical silica | Porous silica |
| Average particle diameter (μm) | 1.0 | 1.8 | 1.0 | 1.6 |
| Amount (wt %) | 0.2 | 0.1 | 0.2 | 0.05 |
| Inert fine particles (B) | Spherical silica | Spherical silica | Spherical silica | — |
| Average particle diameter (μm) | 0.3 | 0.2 | 0.3 | — |
| Amount (wt %) | 0.1 | 0.2 | 0.1 | — |
| Film thickness (μm) | 3.0 | 3.0 | 3.0 | 3.0 |
| HS (%) | 4.4 | 4.3 | 5.2 | 4.4 |
| F-5 value (N/mm$^2$) | 195 | 179 | 185 | 195 |
| HS/F5 | 0.0225 | 0.0240 | 0.0281 | 0.0225 |
| Number of large projections (per mm$^2$) | 5 | 7 | 5 | 0 |
| nz (—) | 1.497 | 1.496 | 1.493 | 1.497 |
| Delamination | 5 | 10 | 90 | 5 |
| Windability | A | A | A | C |
| Printability | ○ | ○ | Δ | ○ |

Ex. = Example
C.Ex. = Comparative Example

In Table 2 above, PEN stands for polyethylene-2,6-naphthalene dicarboxylate, HS signifies a heat shrinkage factor (%) when the film is treated at 200° C. for 10 minutes, F5 signifies an F-5 value (N/mm$^2$) in the longitudinal direction measured at 23° C., the number of large projections is the number of projections having a height of 1.5 μm or more, and nz is a refractive index in the thickness direction.

Example 4

0.03 part of manganese acetate.tetrahydrate was added to a mixture of 100 parts of dimethyl 2,6-naphthalene dicarboxylate and 60 parts of ethylene glycol to carry out an ester exchange reaction by gradually increasing the temperature from 150° C. to 240° C. When the reaction temperature reached 170° C., 0.024 part of antimony trioxide was added and further calcium carbonate particles having an average particle diameter of 1.5 μm and aluminum silicate particles having an average particle diameter of 0.8 μm were also added in amounts of 0.3 wt % and 0.2 wt % in the film, respectively, and when the reaction temperature reached 220° C., 0.021 part (1 mmol %) of tetrabutyl phosphonium 3,5-dicarboxybenzene sulfonate was added. The ester exchange reaction was continued, and 0.023 part of trimethyl phosphate was added after the end of the ester exchange reaction. Thereafter, the reaction product was transferred to a polymerization reactor and heated at 290° C. to carry out a polycondensation reaction under a high vacuum of 0.2 mmHg or less to obtain polyethylene-2,6-naphthalene dicarboxylate having an intrinsic viscosity measured in an o-chlorophenol solution at 25° C. of 0.61 dl/g.

This polyethylene-2,6-naphthalene dicarboxylate was melt extruded into a sheet form by an extruder and a T die and adhered to a water-cooling casting drum at a rate of 37.5 m/min to be solidified by cooling In order to obtain an unstretched sheet. The above coating composition 1 was applied to the side to be coated with an ink layer of this unstretched film as an adhesive layer with a gravure coater to a coating film thickness after drying of 0.1 μm. This unstretched film was introduced into a simultaneous biaxial stretching machine to be preheated at 140° C. and stretched to 5.4 times in the longitudinal direction and to 4.0 times in the transverse direction at 145° C. simultaneously by holding it with clips. Thereafter, it was heat set at 200° C., 230° C. and 235° C. in first, second and third heat setting zones for 2 seconds each to obtain a biaxially oriented film having a thickness of 3.5 μm. The used coatings 1 and 2, thermal transfer ink and their amounts are the same as in Example 1.

The characteristic properties of the obtained heat-sensitive transfer ribbon are shown in Table 3.

Example 5

The procedure of Example 4 was repeated except that the inert particles were changed as shown in Table 3, the stretching temperature was changed to 140° C., the draw ratio in the longitudinal direction was changed to 5.1 times, and the draw ratio in the transverse direction was changed to 3.8 times. The characteristic properties of the obtained biaxially oriented polyester film and heat-sensitive transfer ribbon are shown in Table 3.

Comparative Example 5

An unstretched film was formed in the same manner as in Example 4. After this unstretched film was preheated at 145° C., it was stretched to 5.4 times in the longitudinal direction between high-speed and low-speed rollers, and the above coating 1 as an adhesive layer was applied to the side to be coated with an ink layer with a gravure coater to a coating film thickness after drying of 0.1 μm. Thereafter, the film was stretched to 4.0 times in the transverse direction with a transverse stretching machine at 145° C. by holding it with clips and then heat set in a heat setting zone at 235° C. for 3 seconds to obtain a biaxially oriented polyester film having a thickness of 3.5 μm. The obtained biaxially oriented polyester film was slightly inferior in printability with a slightly large (HS/F5) value, a low refractive index nz in the thickness direction and poor delamination resistance. A heat-sensitive transfer ribbon was produced from the obtained biaxially oriented polyester film by repeating the same procedure as in Example 4. The characteristic properties of the obtained biaxially oriented polyester film and heat-sensitive transfer ribbon are shown in Table 3.

Comparative Example 6

The procedure of Example 4 was repeated except that the inert particles were changed as shown in Table 3. The characteristic properties of the obtained biaxially oriented polyester film and heat-sensitive transfer ribbon are shown in Table 3.

TABLE 3

|  | Ex. 4 | Ex. 5 | C.Ex. 5 | C.Ex. 6 |
| --- | --- | --- | --- | --- |
| Polyester | PEN | PEM | PEN | PEN |
| Orientation | Simultaneous biaxial | Simultaneous biaxial | Sequential biaxial | Sequential biaxial |
| Draw ratio in longitudinal direction | 5.4 | 5.1 | 5.4 | 5.4 |
| Draw ratio in transverse direction | 4.0 | 3.8 | 4.0 | 4.0 |
| Heat setting temperature (° C.) | 235 | 235 | 235 | 235 |
| Inert fine particles (A) | Calcium carbonate | Calcium carbonate | Calcium carbonate | Calcium carbonate |
| Average particle diameter (μm) | 1.5 | 2.0 | 1.5 | 5.0 |
| Amount (wt %) | 0.3 | 0.3 | 0.3 | 0.1 |
| Inert fine particles (B) | Aluminum silicate | Aluminum silicate | Aluminum silicate | Aluminum silicate |
| Average particle diameter (μm) | 0.8 | 0.4 | 0.8 | 0.8 |
| Amount (wt %) | 0.2 | 0.2 | 0.2 | 0.2 |
| Film thickness (μm) | 3.5 | 3.5 | 3.5 | 3.5 |
| Difference in height between mountain and valley (%) | 6.0 | 5.0 | 9.0 | 10.0 |
| Ra (nm) | 25 | 30 | 25 | 50 |
| HS (%) | 4.4 | 4.3 | 5.5 | 4.4 |
| F5 (N/mm$^2$) | 195 | 179 | 185 | 195 |
| HS/F5 | 0.0225 | 0.0240 | 0.0297 | 0.0225 |
| Number of large projections (per mm$^2$) | 480 | 500 | 480 | 2,000 |
| Space factor (%) | 10 | 9 | 12 | 20 |
| nz (—) | 1.497 | 1.496 | 1.494 | 1.497 |
| Delamination | 5 | 10 | 90 | 5 |
| Film forming properties | A | A | B | C |
| printability | ○ | ○ | Δ | Δ |

Ex. = Example
C.Ex. = Comparative Example

In the above Table 3, PEN stands for polyethylene-2,6-naphthalene dicarboxylate, HS signifies a heat shrinkage factor (%) when the film is treated at 200° C. for 10 minutes, F5 signifies an F-5 value (N/mm$^2$) in the longitudinal direction measured at 23° C., the number of large projections is the number of projections having a height of 1.5 μm or more, and nz signifies a refractive index in the thickness direction.

As described above, according to the present invention, there can be provided a film suitable for use as a base film for a heat-sensitive transfer ribbon, which has improved delamination resistance by making use of thermal dimensional stability at a high temperature of a film of a polyester which has high mechanical strength and can be made thin, particularly polyethylene-2,6-naphthalene dicarboxylate.

What is claimed is:
1. A biaxially oriented polyester film which (A) contains 0.1 to 2 wt % of first inert inorganic particles having an average particle diameter of 0.5 to 5 μm, (B) satisfies the relationship HS/F5≦0.028 in which HS is a heat shrinkage factor (%) in the longitudinal direction of the film when it is heated at 200° C. for 10 minutes and F5 is an F-5 value (N/mm$^2$) in the longitudinal direction of the film at 23° C., and (C) is formed by simultaneous biaxial orientation.

2. The film of claim 1 which has a refractive index (nz) in the thickness direction of 1.495 or more.

3. The film of claim 1 or 2, wherein the polyester is polyethylene-2,6-naphthalene dicarboxylate.

4. The film of claim 3 which has a Young's modulus in the longitudinal direction of the film at 190° C. of 200 N/mm$^2$ or more, an F-1 value in the longitudinal direction of the film at 190° C. of 2.5 N/mm$^2$ or more, an F-5 value in the longitudinal direction of the film at 190° C. of 10 N/m$^2$ or more and an F-5 value in the longitudinal direction of the film at 23° C. of 100 N/mm$^2$ or more.

5. The film of claim 1 which has a heat shrinkage factor in both longitudinal and transverse directions of the film of 7% or less when it is heated at 200° C. for 10 minutes.

6. The film of claim 1, wherein the difference between heat shrinkage factors in longitudinal and transverse directions when the film is heated at 200° C. for 10 minutes at positions 1 m away from each other in the transverse direction of the film is 0.3% or less in either direction.

7. The film of claim 1, wherein the first inert inorganic particles are porous silica particles.

8. The film of claim 7 which further contains 0.05 to 2 wt % of silica particles having an average particle diameter smaller than porous silica particles and as large as 0.01 to 0.8 μm with an aspect ratio of 1.0 to 1.2.

9. The film of claim 1, wherein the first inert inorganic particles are first silica particles having an aspect ratio of 1.0 to 1.2.

10. The film of claim 9, wherein the average particle diameter of the first silica particles is 0.5 to 2 μm.

11. The film of claim 9 or 10 which further contains 0.05 to 2 wt % of second silica particles having an average particle diameter smaller than the first silica particles and as large as 0.01 to 0.8 μm with an aspect ratio of 1.0 to 1.2.

12. The film of claim 1, wherein the first inert inorganic particles are calcium carbonate particles.

13. The film of claim 12, wherein the average particle diameter of the calcium carbonate particles is 0.5 to 4 μm.

14. The film of claim 12 or 13 which further contains 0.05 to 1 wt % of aluminum silicate particles having an average particle diameter smaller than the calcium carbonate particles and as large as 0.1 to 2.0 μm.

15. The film of claim 1, wherein the polyester contains a sulfonic acid quaternary phosphonium salt in an amount of 0.05 to 40 mmol % based on the total of all the dicarboxylic acid components.

16. The film of claim 15, wherein the polyester has an AC volume resistivity of 6×10$^8$ Ωcm or less in a molten film state.

17. The film of claim 1 which is coated with a coating solution containing a thermoplastic resin at least on one side thereof.

18. The film of claim 17, wherein the thermoplastic resin contained in the coating solution is at least one resin selected from the group consisting of urethane-based, polyester-based, acrylic and vinyl-based resins.

19. The film of claim 1 which is a base film for a heat-sensitive transfer ribbon.

20. A method of using the film of claim 1 as a base film for a heat-sensitive transfer ribbon.

* * * * *